(12) United States Patent
Potts

(10) Patent No.: US 12,227,931 B2
(45) Date of Patent: Feb. 18, 2025

(54) INFILTRATION SYSTEM WITH DISTRIBUTION CONDUIT

(71) Applicant: David A. Potts, Lyme, CT (US)

(72) Inventor: David A. Potts, Lyme, CT (US)

(*) Notice: Subject to any disclaimer, the term of this patent is extended or adjusted under 35 U.S.C. 154(b) by 250 days.

(21) Appl. No.: 17/717,388

(22) Filed: Apr. 11, 2022

(65) Prior Publication Data

US 2023/0323651 A1    Oct. 12, 2023

(51) Int. Cl.
| | | |
|---|---|---|
| *E03F 1/00* | (2006.01) | |
| *C02F 1/00* | (2023.01) | |
| *E02B 11/00* | (2006.01) | |
| *C02F 103/00* | (2006.01) | |

(52) U.S. Cl.
CPC ............ *E03F 1/005* (2013.01); *C02F 1/001* (2013.01); *E02B 11/005* (2013.01); *C02F 2001/007* (2013.01); *C02F 2103/001* (2013.01)

(58) Field of Classification Search
CPC ........ E02B 11/005; E03F 1/005; C02F 1/001; C02F 2103/001
USPC ..................................................... 405/45, 50
See application file for complete search history.

(56) References Cited

U.S. PATENT DOCUMENTS

| | | | | |
|---|---|---|---|---|
| 3,563,038 A | * | 2/1971 | Healy et al. ......... | E02B 11/005 210/486 |
| 3,654,765 A | * | 4/1972 | Healy ................... | E02B 11/005 52/169.5 |
| 4,045,964 A | * | 9/1977 | Barclay ................ | E02B 11/005 52/169.5 |
| 4,490,072 A | * | 12/1984 | Glasser ................ | E02B 11/005 210/170.07 |
| 4,650,367 A | * | 3/1987 | Dietzler .................... | F16L 9/18 138/172 |
| 4,662,778 A | * | 5/1987 | Dempsey ............... | E01C 13/10 428/17 |
| 4,733,989 A | * | 3/1988 | Harriett ................. | C09J 123/02 405/50 |
| 4,840,515 A | * | 6/1989 | Freese ................... | E02D 31/02 405/36 |
| 4,880,333 A | * | 11/1989 | Glasser .................. | E02B 11/00 405/36 |
| 4,925,342 A | * | 5/1990 | Hendy .................... | E02B 11/00 405/36 |
| 4,943,185 A | * | 7/1990 | McGuckin ............. | E02B 11/00 405/38 |

(Continued)

FOREIGN PATENT DOCUMENTS

FR          2858565 A1     2/2006

*Primary Examiner* — Frederick L Lagman
(74) *Attorney, Agent, or Firm* — GRASSO PLLC

(57) ABSTRACT

Systems, processes, apparatus, and articles of manufacture that may be configured, designed, manufactured, transported, installed or operated to subsequently provide water distribution between or within areas of an infiltration field are provided. The water distribution within an infiltration field may be via a distribution conduit positioned in direct contact with a water egress portion of an infiltration field. The water egress portion of the infiltration field may be positioned at the bottom or along the sides of an infiltration field galley, at the bottom or along the sides of a channel, whether in a module or other application, at the bottom or along the sides of an infiltration baffle matrix, and/or at the bottom or along the sides of other water egress areas of an infiltration field.

25 Claims, 12 Drawing Sheets

(56) References Cited

U.S. PATENT DOCUMENTS

| | | | | |
|---|---|---|---|---|
| 5,017,042 | A | * | 5/1991 | Minor .................... E02D 31/02 405/36 |
| 5,588,777 | A | | 12/1996 | Laak |
| 5,857,297 | A | * | 1/1999 | Sawyer .................. E02D 31/02 52/169.5 |
| 5,899,031 | A | * | 5/1999 | Nagaoka ................. E02D 3/10 52/741.11 |
| 5,951,203 | A | * | 9/1999 | Laak ..................... B01D 39/14 405/36 |
| 6,048,131 | A | * | 4/2000 | Laak ..................... E02B 11/00 405/36 |
| 6,648,550 | B1 | * | 11/2003 | Parker ................... E02B 11/00 52/169.5 |
| 6,659,687 | B1 | * | 12/2003 | Donlin ................... E03F 1/002 405/36 |
| 7,374,670 | B2 | * | 5/2008 | Potts ..................... C02F 3/02 210/150 |
| 7,614,822 | B1 | * | 11/2009 | Burritt ................... E03F 1/002 210/170.08 |
| 8,104,994 | B1 | * | 1/2012 | Donlin ................... E02B 11/005 405/36 |
| 8,142,106 | B2 | * | 3/2012 | Couch .................... E03F 1/002 405/51 |
| 9,045,874 | B1 | * | 6/2015 | Kondas ................... E02D 31/02 |
| 9,656,892 | B2 | * | 5/2017 | Potts ..................... C02F 3/046 |
| 11,059,732 | B2 | | 7/2021 | Potts et al. |
| 2021/0155517 | A1 | | 5/2021 | Potts |

* cited by examiner

INFILTRATION SYSTEM WITH DISTRIBUTION CONDUIT

TECHNICAL FIELD

Water infiltration system design, transport, installation, operation, and manufacture are provided and described. More specifically, distribution conduit is employed with various transportable and/or installed water infiltration system designs whereby the distribution conduit provides or is designed to provide passages of flow for water within an infiltration system to flow from one area of an infiltration system to another area of an infiltration system.

BACKGROUND

Water having various sources including septic wastewater, storm water, and process water (all of which may herein be collectively referred to as "water") may be treated via an infiltration system of a water treatment system. Water treatment systems can vary in size and scope. They can be sized for treatment of large amounts of water from a municipality or other large cumulative systems for benefitting many residences, businesses, and industrial facilities serviced by the municipality. Infiltration systems and the water treatment systems they can be a part of, can also be designed and sized for single-home residential use and small-scale residential and commercial uses.

In the various applications, a water treatment system will often include one or more infiltration fields. These infiltration fields often receive water from an upstream source such as a treatment vessel and pass the water to surrounding soil via infiltration. The water is treated as it passes through the infiltration field and into the surrounding soil. The infiltration field can include water channels that receive the water and pass it to the surrounding soil. The channels can have various shapes including being large open galleys as well as smaller rectangular flow channels. When water is not evenly distributed in an infiltration field to the channels some channels accumulate water and become overloaded while other channels of the infiltration field receive less water and/or become or remain dry. In overloaded channel/dry channel instances, an infiltration field is not performing at its maximum throughput.

DETAILED DESCRIPTION

Figure 1:
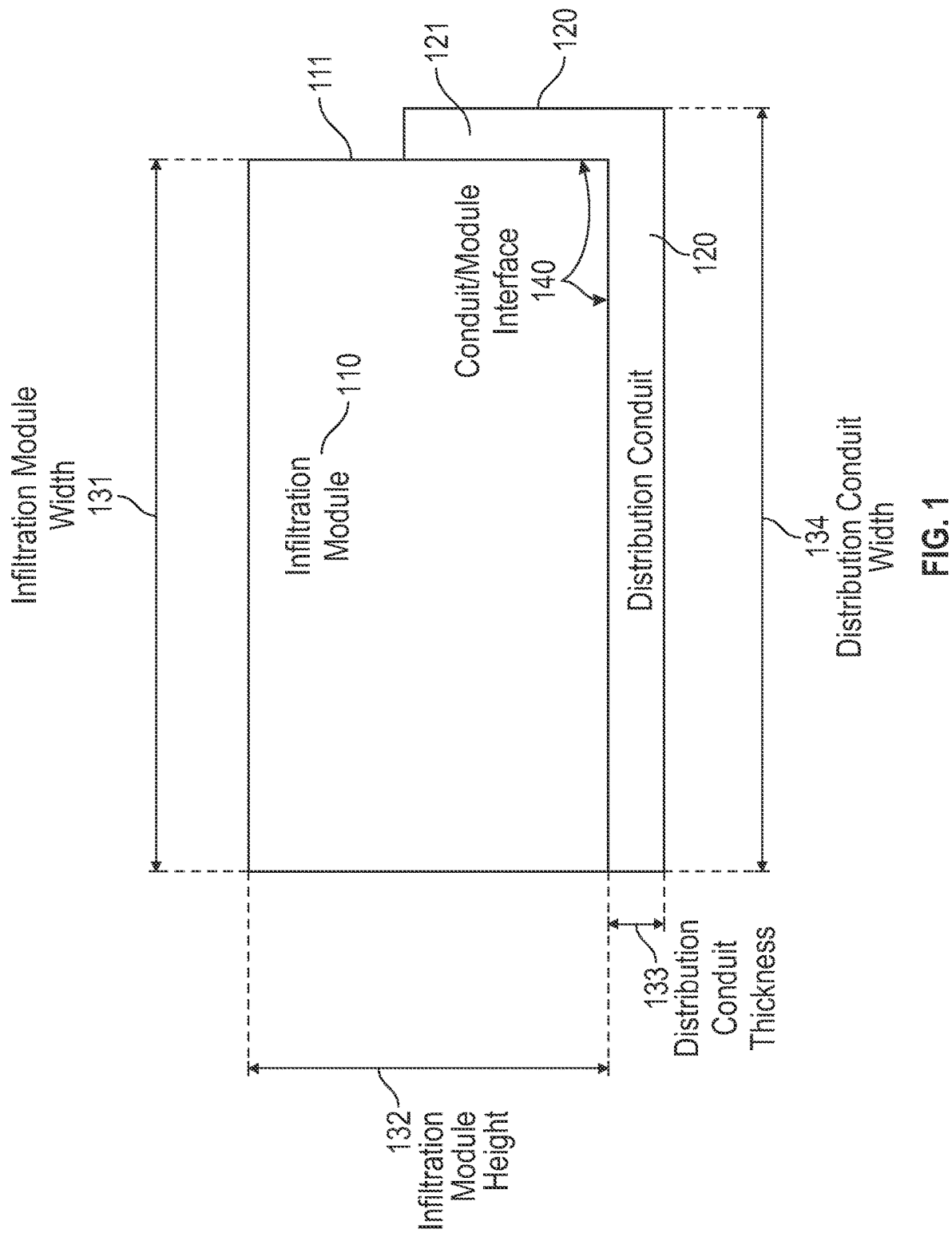
FIG. 1 provides a side elevation view of an infiltration module with underlying distribution conduit prior to or after installation as may be employed in some embodiments.

This disclosure provides systems, processes, apparatus, and articles of manufacture that may be configured, designed, manufactured, transported, installed or operated to subsequently provide water distribution between or within areas of an infiltration field. Disclosed infiltration fields may or may not comprise infiltration modules. The infiltration fields may be in-situ, i.e., installed and hooked up to water sources or installed but not yet hooked up to water sources. The infiltration modules of embodiments may be assembled in an infiltration field, may be assembled prior to placement, and may reside elsewhere prior to installation, e.g., be fully or partially assembled for transport, during manufacture, for on-site assembly, etc. The module(s) may be transportable or may also be installed at a water treatment system site ahead of final installation and hookup. The water distribution within an infiltration field may be via a distribution layer such as a distribution conduit positioned in direct contact with a water egress portion of an infiltration field. The water egress portion of the infiltration field may be positioned at the bottom and/or or along the sides of an infiltration field galley, at the bottom and/or along the sides of a channel, whether in a module or other application, at the bottom or along the sides of an infiltration baffle matrix, and/or at the bottom or along the sides of water egress areas of a channel or other areas of an infiltration field.

A distribution conduit as used herein should be understood to mean a fluid passage that may comprise: a pipe that permits the passage of water or a fluid conductive structure that permits the passage of water, or a fluid conductive material that permits the passage of water as well as combinations thereof. Water should be able to be passed from one channel to another channel by one or more distribution conduit. Fluid conductive material may contain fabric or filaments or plastic or stone as well as combinations thereof. Distribution conduits may have various thicknesses where a typical thickness range can comprise at least about one-eight inch to about two inches or more of thickness. A distribution conduit permits the passage of water within it and can be hollow as well as not hollow but permeable or otherwise a via to water to allow the passage of water by the distribution conduit. The flow rates of water via the distribution conduit are typically similar or greater than the flow rates of water within the channels. In other words, water may flow as freely or more freely via the distribution conduit as flow in the channels. The distribution conduit may be hollow such as flat pipe conduit. The distribution conduit can comprise material such as geotextile mat, woven material, three-dimensional plastic grid, crenulated material, and layered material, cuspated material. The distribution conduit can underlie an infiltration module whether the module is yet to be installed or is installed in the ground. The distribution conduit can also be positioned along one or more sides of an infiltration module whether the module is yet to be installed or is installed in the ground. The distribution conduit is preferably in direct fluid contact with the infiltration module once fully installed and backfilled such that water may flow via the distribution conduit from one area of the infiltration module to another area of the infiltration module, e.g., from one channel to another channel. This direct fluid contact may or may not include one or more layers of filter fabric or other intervening material that is permeable to water. However, the direct fluid contact may also not comprise any layers of filter fabric or other intervening material that is permeable to water between the one or more channels and the distribution conduit(s).

As noted above, infiltration fields of embodiments may be assembled on site or may be manufactured off site or combinations of both. Transportable infiltration modules may be assembled off-site and then placed at an infiltration field and partially or finally assembled, connected, and backfilled on site. Infiltration fields may also be partially or fully assembled on site, connected, and backfilled in embodiments. A distribution conduit may be employed in some or all infiltration field areas of embodiments, whereby the distribution conduit may be in direct contact with some or all channels, infiltration baffle matrix, or other water conveying portions of the infiltration module or in-situ infiltration field, so as to be configured to provide water distribution, e.g., water transport and/or water balancing between and/or within the water conveying portions of the infiltration module or in-situ infiltration field.

Accordingly, embodiments may comprise a wastewater infiltration field system with a plurality of channels positioned over and in contact with a distribution conduit. Some or all of the channels can be for wastewater flow and some or all can contain air, filter fabric or sand or a granular material. The channels can be touching each other and/or spaced apart from each other with gaps for air, filter fabric, sand etc. The distribution conduit can be planar or substantially planar and positioned in direct contact with bottoms of the channels. The distribution conduit may comprise a permeable interface surface to allow water transport between the bottoms of the channels and the distribution conduit. The distribution conduit may comprise a permeable core in certain embodiments. The channels may be individually or cumulatively covered with a geotextile fabric. Every channel may be unfilled in some embodiments. Every other channel may be empty but may, in certain embodiments, be filled with (or at least partially contain) sand having a minimal number of fines (e.g., concrete sand). Channels not containing sand or other filler may be hollow or may contain structures to maintain separation or spacing or sizing of the non-sand channels. These structures may be egg-crate like, plastic, as well as other three-dimensional grids with and without specific repeating structures. Channel walls may also comprise these egg-crate like, plastic, as well as three-dimensional grids. The distribution conduit may itself be covered on top, bottom, or all around with geotextile fabric. The geotextile fabric may have a regular thickness of 0.001-0.1" or so, as well as be thinner or thicker. The distribution conduit can have a regular thickness of 1"-2" or so, as well as be thinner or thicker. Exemplary distribution conduits may be made from entangled polymer filaments or threads, polymers, stone, three-dimensional structures, flat pipes, and other materials as explained herein. The distribution conduit, which may have a uniform or varying thickness, may be sized and shaped to redistribute wastewater from one area of the plurality of channels of an infiltration field module, in-situ infiltration field, etc., to another area of the plurality of channels of the infiltration field module, the in-situ infiltration field, etc. The distribution conduit serves to redistribute water that otherwise can predominantly flow through less than all of the channels of an infiltration field. The water can travel from some channels, through the horizontal mat, and enter the other channels from the bottom. This ultimately serves to retard fluid overloading associated with certain channels and redistribute the water flow to some or all the other channels, even if the water is only initially directed to a fraction of channels from a dosing conduit or other water supply. This redistribution may allow water infiltration systems to operate more completely, treat better and enhance the fluid lifespan of such systems.

Infiltration modules of embodiments may be manufactured partially or fully offsite and transported to a jobsite, for final assembly if needed, for connection to one or more other modules, and for final installation in a wastewater treatment system. Partially assembled infiltration modules may contain a plurality of channels and/or infiltration baffle matrix. The partially assembled infiltration modules may also contain one or more dosing conduit coupled to the channels and/or infiltration baffle matrix. Distribution conduit may also be included in a partially assembled infiltration module whereby the mat may be positioned and secured to lower or bottom portions of the channels and/or infiltration baffle matrix. Partially assembled infiltration modules may be transported to a job site for connection, final assembly and connection. The final assembly and connection may include attaching dosing conduits to infiltration modules and to each other, attaching distribution conduit to one or more infiltration modules, wrapping or placing filter fabric at or around various components and sides, positioning the infiltration modules in a water treatment system, and backfilling the assembled and connected infiltration modules. In some embodiments, the distribution conduit may be coupled to the infiltration module during manufacture while in other embodiments the distribution conduit may be coupled after initial manufacture.

Embodiments may also employ infiltration fields assembled onsite without the use of transportable infiltration modules. This onsite assembly can include excavation of a water treatment infiltration field, assembly of the various components of the infiltration field as described in the various teachings herein, including: placing the distribution conduit in contact with lower channel portions and/or bottoms of channels and/or infiltration baffle matrix; providing a dosing conduit to supply water to the channels and/or infiltration baffle matrix; and backfilling the connected assembly. Existing infiltration modules can also be retrofitted on properly functioning or failing systems by digging along the sides of the modules and installing infiltration mats along the sides of the modules to enhance system performance.

In operation, water reaching the channels of an infiltration module of an infiltration field may be redistributed via the distribution conduit to other areas of the infiltration module. For example, adjacent channels of an infiltration field may not receive equal amounts of wastewater from a dosing conduit. Thus, one channel may have more wastewater than an adjacent or nearby channel of the infiltration field. Water may enter the distribution conduit and be redistributed from one channel of the infiltration field to another channel of the infiltration field. These channels may be in the same infiltration module but may also be in different modules provided they are close by and the distribution conduit reaches both channels.

A distribution conduit in embodiments may be positioned in direct contact with several channels such that water may pass between channels, i.e., channels with more water may pass the water to channels with less water via the distribution conduit. This rebalancing of water in the infiltration field can serve to promote the longevity, enhance treatment and efficiency of the infiltration field. As discussed below, the distribution conduit and the channels may comprise filter fabric, however in preferred embodiments filter fabric wrapping or layers should not preferably be positioned to prevent direct passage of water from a first channel through the distribution conduit to a second channel. Likewise, filter fabric should preferably be positioned or sized to facilitate water passage from a first area of an infiltration module, through the distribution conduit, to a second area of an infiltration module.

An infiltration field system of embodiments may comprise an infiltration module with a plurality of channels arranged as a baffle matrix having a plurality of upright walls, where some of the walls may be spaced apart from others. Wastewater may be fed into these spacings between walls and travel downwards through the channels arranged as a baffle matrix until the water reaches a distribution conduit sitting below and/or to the side of the channels arranged as a baffle matrix. The wastewater may be fed from a dosing conduit or other wastewater transport. The channels arranged as a baffle matrix may sit atop a filter fabric and/or be individually or cumulatively wrapped in filter fabric. A permeable core distribution conduit may sit below the channels arranged as a baffle matrix and may be touching the filter fabric or the channels arranged as a baffle matrix directly. The distribution conduit, which may have a uniform or varying thickness, may be sized and shaped to redistribute wastewater from one area of the channels arranged as a baffle matrix to another area of the channels arranged as a baffle matrix. The distribution conduit serves to redistribute water that may predominantly flow through one or more channels arranged as a baffle matrix. The water can travel through the underlying and or/surrounding permeable distribution conduit and enter other channels of the baffle matrix from the bottom and/or sides. This ultimately serves to prevent fluid overloading associated with certain channels of the baffle matrix and redistributes the flow to the all the channels of the baffle matrix even if it is initially directed to a fraction of channels. This ultimately allows systems to treat more completely and enhance the lifespan of the system. Channels arranged as a baffle matrix may be considered to be a type of infiltration field component. The channels arranged as a baffle matrix may be transportable and configured as an infiltration module and may also be assembled on-site form its constituent parts. The channels arranged as a baffle matrix in preferred embodiments can have a plurality of upright walls that are spaced apart from each other where water is intended to be fed into spaces been the walls. The walls may have different heights and/or positions such that some of the walls reach and touch a distribution conduit, whether distribution conduit is on the sides or bottoms of the channels, while other walls do not necessarily reach and touch the distribution conduit. Water may be redistributed within channels arranged as a baffle matrix by flowing below walls that touch the distribution conduit.

Embodiments may comprise a water infiltration system, prior to installation, comprising a plurality of upright channels, each channel having an upright passage with an open or permeable bottom or side, each channel having a height and a width; and a distribution conduit having a thickness of 0.0125 inches or more positioned on a side and/or partially underneath the plurality of upright channels, the distribution conduit touching a portion of the bottom and/or a portion of the side of an infiltration channel of the plurality of upright channels. In some embodiments, a water infiltration field system, which includes upright passages of channels of a plurality of upright channels, may be parallel to each other. In some embodiments a distribution conduit may comprise an outer surface of geotextile fabric that would contact surrounding treatment medium. In some embodiments a treatment medium may be beneath and/or beside the distribution conduit. In some embodiments, when installed, a bottom of each channel of a plurality of upright channels may be more water permeable than surrounding treatment medium. In some embodiments, when installed, a distribution conduit may be more permeable than surrounding sand or soil. In some embodiments, each channel of a plurality of upright channels may comprise an upright cuspated wall. In some embodiments the height to width aspect ratio of each channel is three or more and no more than 96.

Embodiments may comprise a water infiltration field system comprising a first upright channel; a second upright channel adjacent to the first upright channel; a conduit in fluid communication with the first and second upright channels; and a distribution conduit having a thickness of 0.0125 inches or more and positioned underneath and/or covering a portion of one or more sides and touching the first and second upright channels. In some embodiments, a distribution conduit has a thickness of ¾ inch or more and a first upright channel and a second upright channel each have a height to width aspect ratio of three or more and no more than 96. In some embodiments, a distribution conduit comprises a repeating plastic grid. In some embodiments, a distribution conduit comprises a stringy structure comprising entangled polymer filaments. In some embodiments, a first upright channel is parallel to a second upright channel. In some embodiments, a first upright channel is wrapped with geotextile fabric and a distribution conduit is wrapped with geotextile fabric and the height to width aspect ratio of the first upright channel is different than the height to width aspect ratio of a second upright channel. In some embodiments, a distribution conduit is at least partially underlain by a treatment medium. In some embodiments, a first upright channel and a second upright channel have a treatment medium at least partially below them. In some embodiments, a treatment medium comprises sand or soil.

Embodiments may comprise a transportable water infiltration field system comprising: a plurality of upright channels, each channel having a plurality of upright walls some of which may be covered in filter fabric, each channel having a height and a width; and a distribution conduit having a thickness of 0.0125 inches or more positioned underneath each channel of the plurality of upright channels, the distribution conduit touching a bottom and/or side of each channel of the plurality of upright channels or the distribution conduit touching the bottom portion of an upright interface or filter fabric of each channel of the plurality of channels. In some embodiments, at least one upright channel of a plurality of upright channels comprises sand. In some embodiments, filter fabric may be positioned along at least some upright walls of the plurality of upright walls. In some embodiments, a first upright channel of a plurality of upright channels has a first height to width aspect ratio and a second upright channel of a plurality of upright channels has a second height to width aspect ratio, the second height to width aspect ratio being larger than the first height to width aspect ratio. In some embodiments, the height to width aspect ratio of each upright channel of a plurality of upright channels is three or more and no more than 96. In some embodiments, when installed, a treatment medium may be positioned outside of at least one upright channel of a plurality of upright channels and below a distribution conduit.

Embodiments may comprise a transportable water infiltration field system comprising an infiltration baffle matrix, the infiltration baffle matrix having a height, a width, and a length, the infiltration baffle matrix comprising a plurality of upright walls, where at least some of the upright walls are distinct and separated from each other; and a distribution conduit having a thickness of 0.0125 inches or more positioned underneath a majority of the width and length of a majority of the infiltration baffles. In some embodiments, filter fabric can be positioned about an infiltration baffle matrix and a distribution conduit. In some embodiments, when connected to a wastewater source, a dosing conduit may be in fluid communication with the infiltration baffle matrix, the dosing conduit may be positioned to discharge wastewater atop or into at least some of the upright walls of the infiltration baffle. In some embodiments, one or more upright walls comprises a polymer and/or a filter fabric, wherein a majority of upright walls of an infiltration baffle matrix may be parallel to each other, and the infiltration baffle matrix may at least be partially wrapped in filter fabric. In some embodiments, a first upright wall of a plurality of walls may be solid and comprise a first polymer and a second upright wall of a plurality of walls comprises the first polymer and comprises perforations. In some embodiments, a plurality of upright walls comprises at least six upright walls.

FIG. 1 provides a side-elevation view of an infiltration module 110 with underlying distribution conduit 120 prior to or after installation as may be employed in some embodiments. As can be seen, a large portion of the distribution conduit 120 sits underneath the infiltration module 110 but a portion 121 of the distribution conduit 120 is shown to be adjacent to a side 111 of the infiltration module 110. Also labelled in FIG. 1 are the module conduit interfaces 140, infiltration module width 131, infiltration module height 132, distribution conduit thickness 133, and distribution conduit width 134. The infiltration module 110 may have various configurations, including those shown in FIGS. 3, 4A-4C, 5A-5B, 6A-6C, and 7-9. Consistent with the above, in some embodiments, interfaces between at least portions of the infiltration module and the distribution conduit will be in direct contact with other. In some embodiments interfaces between at least portions of the infiltration module and the distribution conduit will have a geotextile fabric positioned therebetween. However, in these and other embodiments preferred embodiments should have at least some of the channels in direct fluid contact with the distribution conduit such that water may be redistributed within the infiltration module via the distribution conduit. Redistribution, in other words, provides for water present in the infiltration module to leave the channels or other water retention areas of the infiltration module pass through the distribution conduit and reenter the channels or other water retention areas of the infiltration modules. This passage of water can serve to rebalance water levels in the infiltration module. In some embodiments all of the channels may be in direct contact with the distribution conduit such that water may flow between channels via the distribution conduit. Comparatively, in some embodiments a portion of the channels may not be in direct contact with the distribution conduit such that water may not flow between channels via the distribution conduit for these channels not in direct contact with the distribution conduit. As described in more detail below, there may be various configurations to the infiltration modules.

Figure 2:
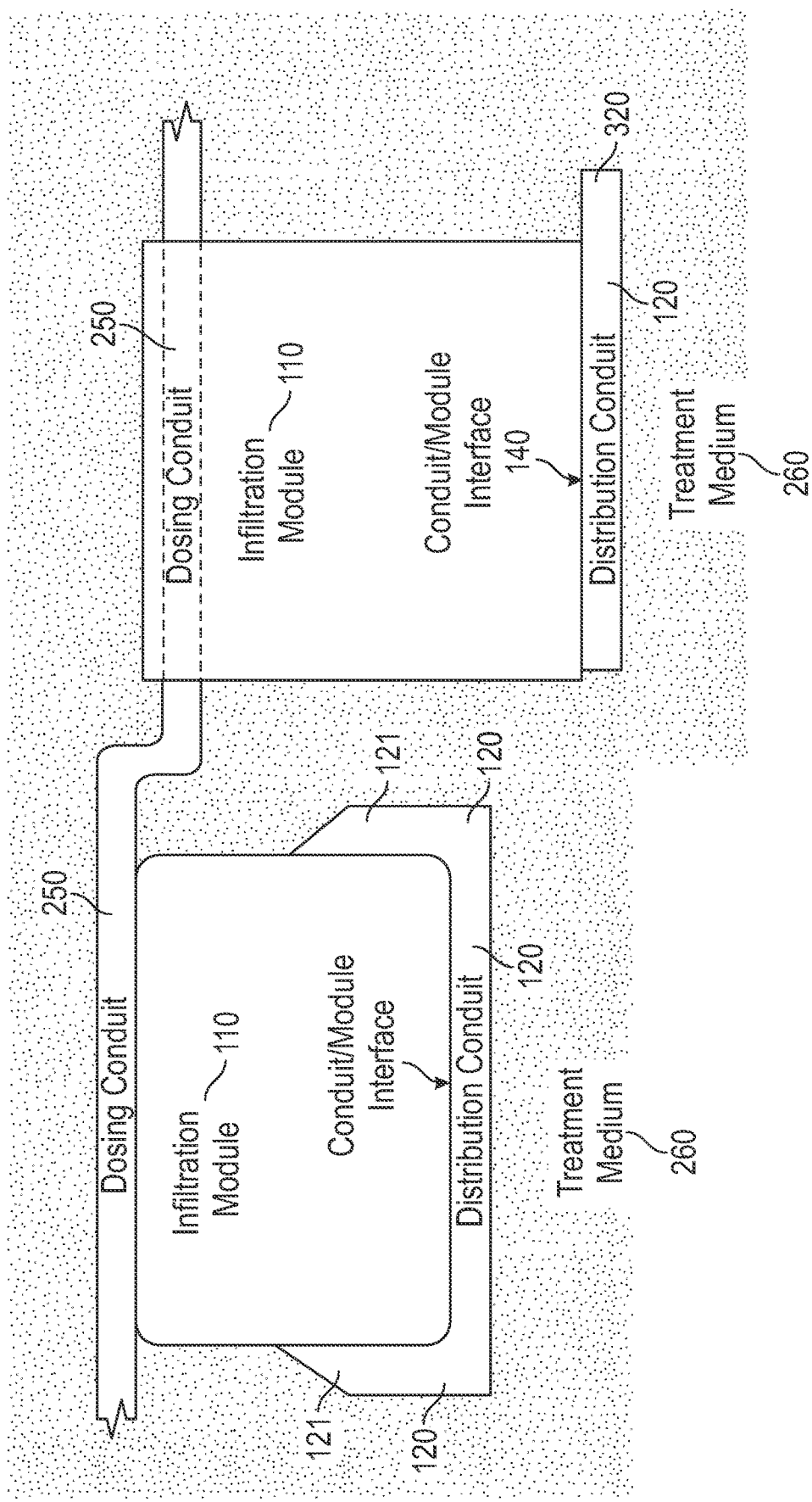
FIG. 2 provides a side elevation view of two infiltration modules each with underlying distribution conduits in an installed position and being connected to a dosing conduit and at least partially bordered by treatment medium as may be employed in some embodiments.

FIG. 2 provides a side-elevation view of two infiltration modules 110, each with underlying distribution conduits 120 in an installed position and being connected to a dosing conduit 250, and at least partially bordered by treatment medium 260, as may be employed in some embodiments. Also labelled in FIG. 2 are distribution conduit portion 121, distribution conduit overhang 320, and distribution conduit/module interface 140. The treatment media 260 may comprise various media including soil, such as sand, and as otherwise enumerated herein. The infiltration modules 110 may be assembled on site or may be manufactured off site and simply installed at an installation site. Partial assembly is also envisioned whereby some components may arrive preassembled to a job site and other components, such as the dosing conduit 250 or the distribution conduit 120 be combined with other sub-assemblies prior to final installation. As can be seen in FIG. 2, the dosing conduit 250 may have various positions relative to the infiltration module 110. As can be seen in the left module of FIG. 2 the dosing conduit 250 can sit above an infiltration module 110 and as can be seen in the right module of FIG. 2 a dosing conduit can pass through an infiltration module 110. Various components may comprise a dosing conduit including round, oblong, flat, and other types of pipes as well as other water carrying conduits. As can also be seen in FIG. 2, infiltration modules, when installed, need not sit at the same invert elevation, however, unless under pressure, a typical gravity fed dosing conduit will be installed with a downward pitch to promote water flow. The left infiltration module 110 of FIG. 2 shows how portions 121 of a distribution conduit can wrap up the sides of an infiltration module 110. The distribution conduit 120 is shown wrapping up somewhat less than half of the sides of the infiltration module in FIG. 2. Other wrapping configurations are also possible, such as all the sides are in contact with the surrounding distribution conduit. In other words, the distribution conduit 120 may wrap up one, two, three, etc. sides of an infiltration module and may cover some, most or all of a side of an infiltration module. Also visible in FIG. 2 is that the treatment media 260 sits beside the bottom, sides, and top of the installed infiltration modules of the infiltration field of FIG. 2. This treatment media 260 may be placed before, during, and after the assembly and positioning of the infiltration module and distribution conduit and dosing pipe of FIG. 2.

Figure 3:
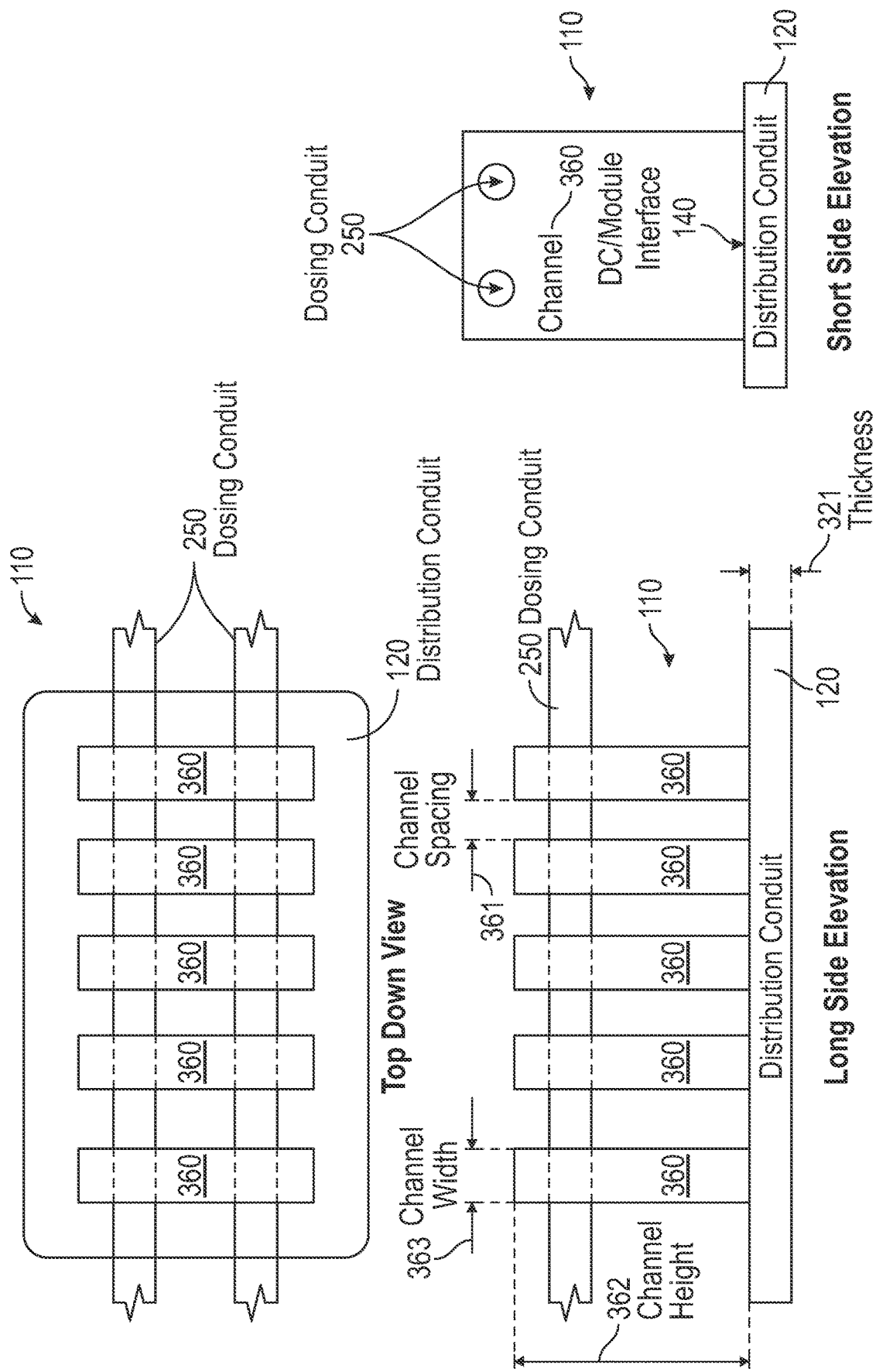
FIG. 3 provides two side-elevation views and a top-down view of an infiltration module with multiple channels, underlying distribution conduit, and two dosing conduits, as may be employed in some embodiments.

FIG. 3 provides two side-elevation views and a top-down view of an infiltration module 110 with multiple channels 360, underlying distribution conduit 120, and two dosing conduits 250, as may be employed in some embodiments. Spacing between channels 360 is labelled at 361 while channel height is at 362, and distribution conduit thickness is at 321. As can be seen in FIG. 3 infiltration modules may comprise channels 360, having a width of 363, whereby the channels 360 are positioned to receive water from a dosing conduit 250 and discharge the water to a distribution conduit 120. The channels 360 may be spaced apart from each other in some embodiments. This channel spacing 361 may be greater than, equal too, or less than the channel widths 363. The spacings 361 may be empty or may contain material. This material may include spacers, such as three-dimensional grids, block, columns, pegs, rounds, cuspated sheets, etc. as well as treatment media such as soil. In some embodiments the channels may have a height to width aspect ratio in the range of 3 to 96 including 3 and 96. The channels may be wrapped in filter fabric or may have one or more surfaces covered in filter fabric. In preferred embodiments, as mentioned above, a direct fluid contact between the distribution conduit and the bottom or side of the channel is preferred such that water may pass through the distribution conduit/module interface 140 and allow for rebalancing of water from one channel to another in embodiments. Where distribution channels are arranged as a baffle matrix, a distribution conduit may alloy for rebalancing from one portion of the baffle matrix to another portion of the baffle matrix.

Figure 4A:
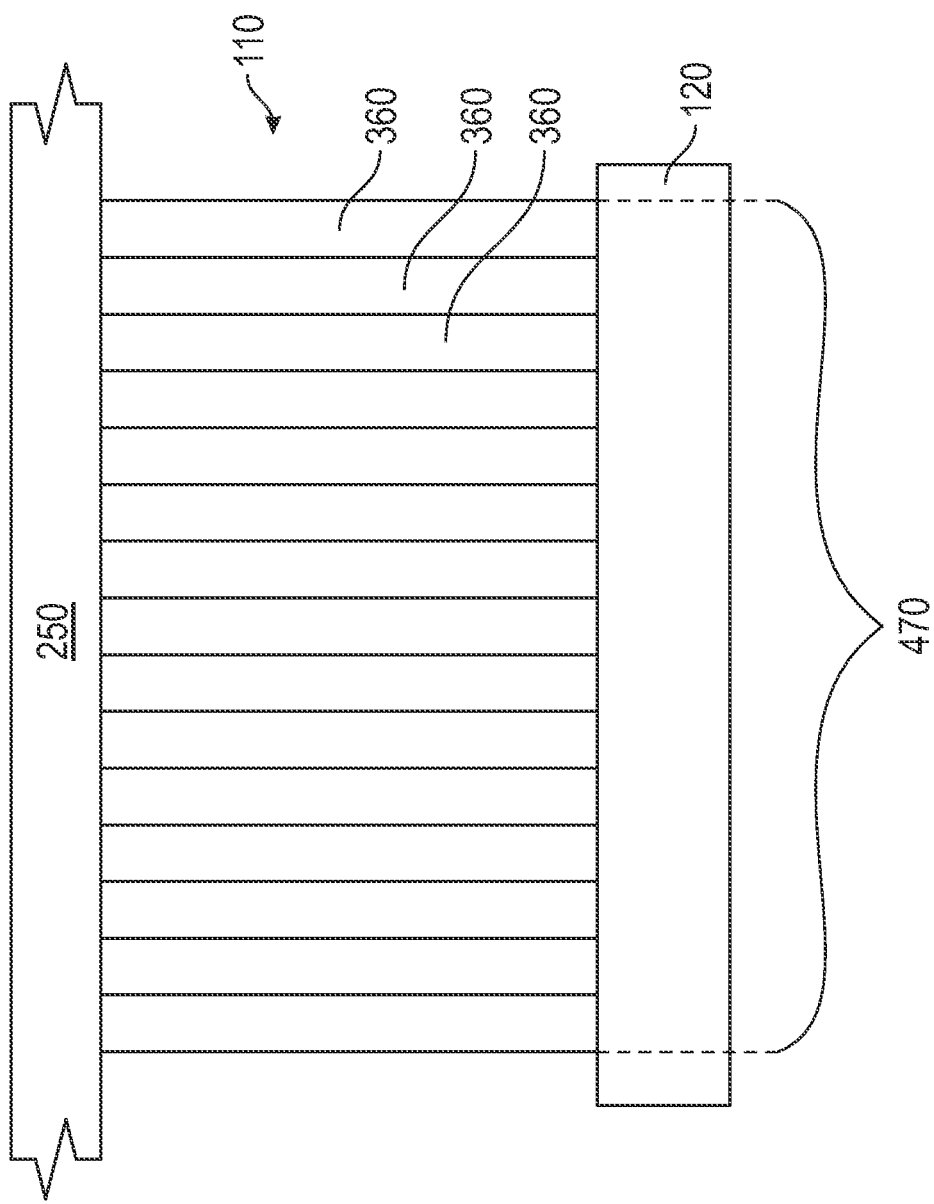
FIG. 4A is a side elevation-view of an infiltration module with multiple channels arranged as a baffle matrix as may be employed in some embodiments.
Figure 4B:
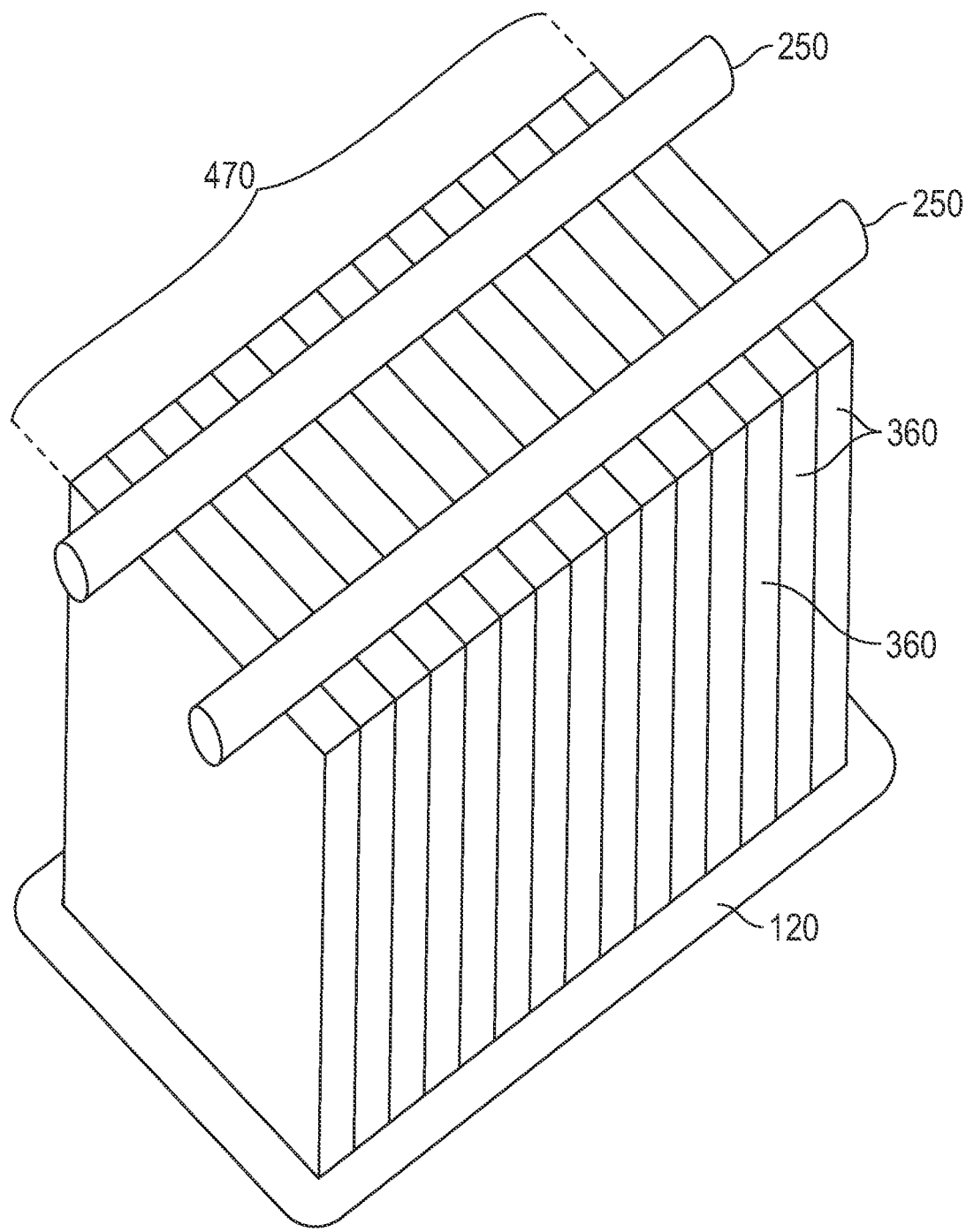
FIG. 4B is a perspective-view of the infiltration module of FIG. 4A and shows the multiple infiltration module channels arranged as a baffle matrix as well as a plurality of dosing conduits and underlying distribution conduit as may be employed in some embodiments.
Figure 4C:
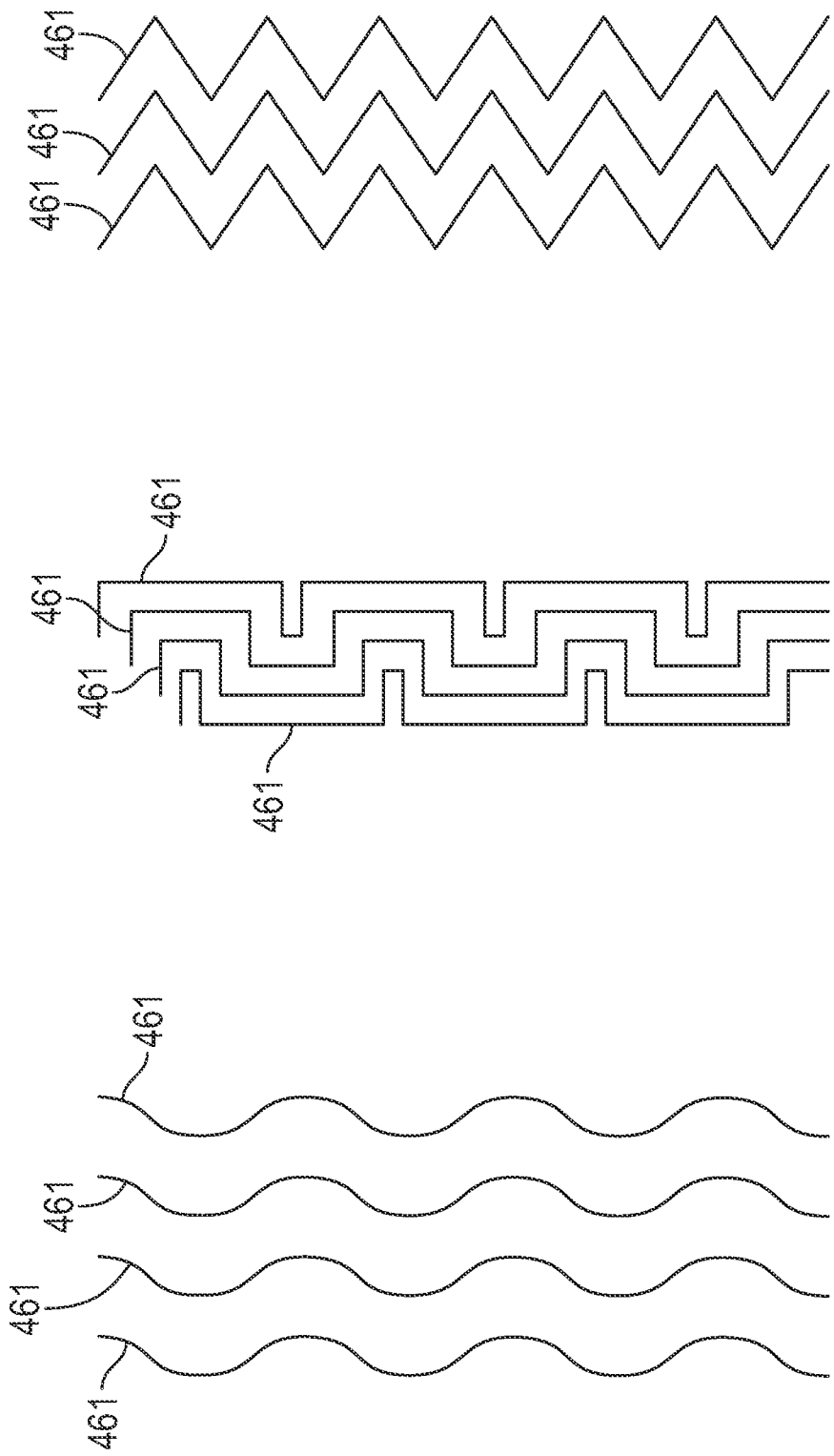
FIG. 4C shows side-views of various upright channel walls, which may or may not be employed in the infiltration modules of some embodiments.

FIG. 4A is a side elevation-view of an infiltration module 110 with multiple channels 360 arranged as a baffle matrix 470 as may be employed in some embodiments. FIG. 4B is a perspective-view of the infiltration module of FIG. 4A and shows the multiple module channels 360 arranged as a baffle matrix 470 as well as a plurality of dosing conduits 250 and underlying distribution conduit 120 as may be employed in some embodiments. The distribution conduit 120 is shown to be larger than the infiltration module 110 in FIGS. 4A and 4B. In embodiments the distribution conduit may be the same width and length of an overlying infiltration module and may also be larger or smaller. In FIGS. 4A and 4B the distribution conduit is both longer and wider than the overlying infiltration module. In certain embodiments the channel walls may be generally aligned with each other and uniformly or variable spaced apart. This aligned and spaced apart orientation may be described as an infiltration baffle matrix as is shown in FIGS. 4A-4C. Such matrices may have a plurality of adjacent walls that are or are not parallel to each other and may or may not have equal spacing there between. FIGS. 4A and 4B show infiltration baffle matrix 470 with a plurality of adjacent channels 360 without spaces between adjacent channels 360. Thus, walls of inner channels form the border of directly adjacent channels as can be seen in FIGS. 4A and 4B. As noted above, the walls of the infiltration baffle matrix 470 may all be the same or similar height and may have different heights as well. In some embodiments, the bottoms of each wall may touch the distribution conduit while in other embodiments only some bottoms of the walls may touch the distribution conduit.

FIG. 4C shows side-views of various upright channel walls 461 aligned in a baffle orientation without spaces between adjacent channels and/or shared walls of adjacent channels, which may or may not be employed in the infiltration modules of some embodiments. As can be seen, the walls of infiltration modules may not only be planar or substantially planar as shown in FIGS. 4A and 4B, the walls may be crenulated, wavy, saw-toothed, etc., and have other patterns or configurations as well.

Figure 5A:
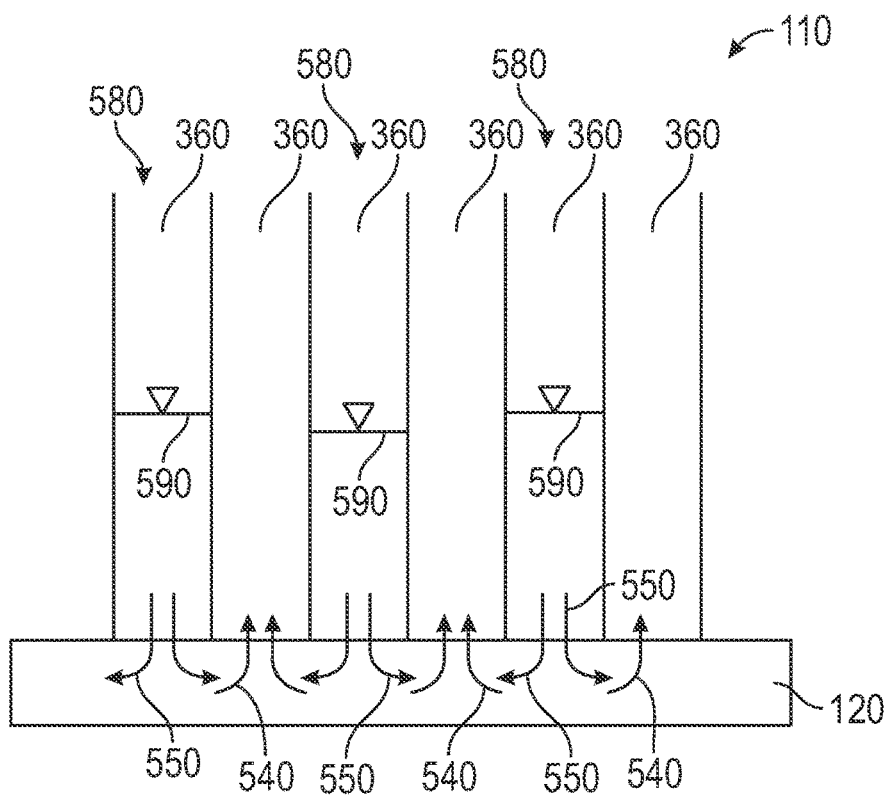
FIGS. 5A and 5B show a side-view of an installed infiltration module where water is distributed via the distribution conduit from and to channels of the infiltration module as may occur during operation of some embodiments.
Figure 5B:
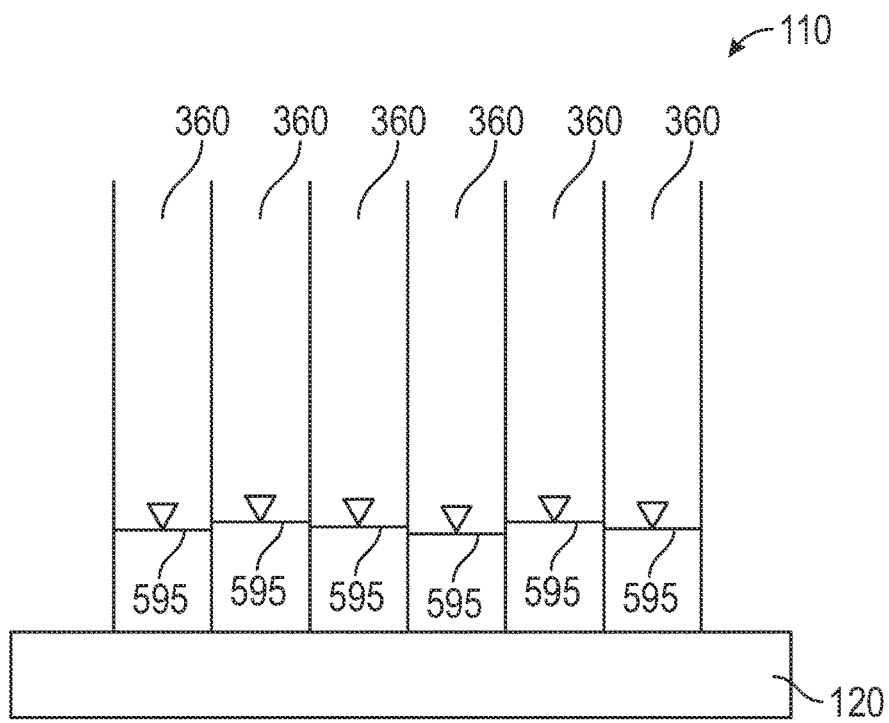

FIGS. 5A and 5B show a side-view of an installed infiltration module where water is distributed via the underlying distribution conduit 120 from and to channels 360 of the infiltration module 110 as may occur during operation of some embodiments. Water is shown being dosed at arrows 580 into some of the channels 360 of FIG. 5A. Water levels 590 of FIG. 5A show water at the beginning or an early stage of redistribution via the distribution conduit 120 while water levels 595 of FIG. 5B show water after redistribution via the distribution conduit 120. As can be seen in FIG. 5B noticeable water levels 595 are shown in each of the channels 360 while in FIG. 5A noticeable water levels 590 are present in only three channels 360. Arrows 550 of FIG. 5A show water flowing out of the infiltration modules 360 and to the distribution conduit 120 while arrows 540 of FIG. 5A show water flowing up from the distribution conduit 120 and into the infiltration modules channels 360. This water flow from channels to other channels results in the water level differences shown from FIG. 5A (before rebalancing) to FIG. 5B (after rebalancing).

Figure 6A:
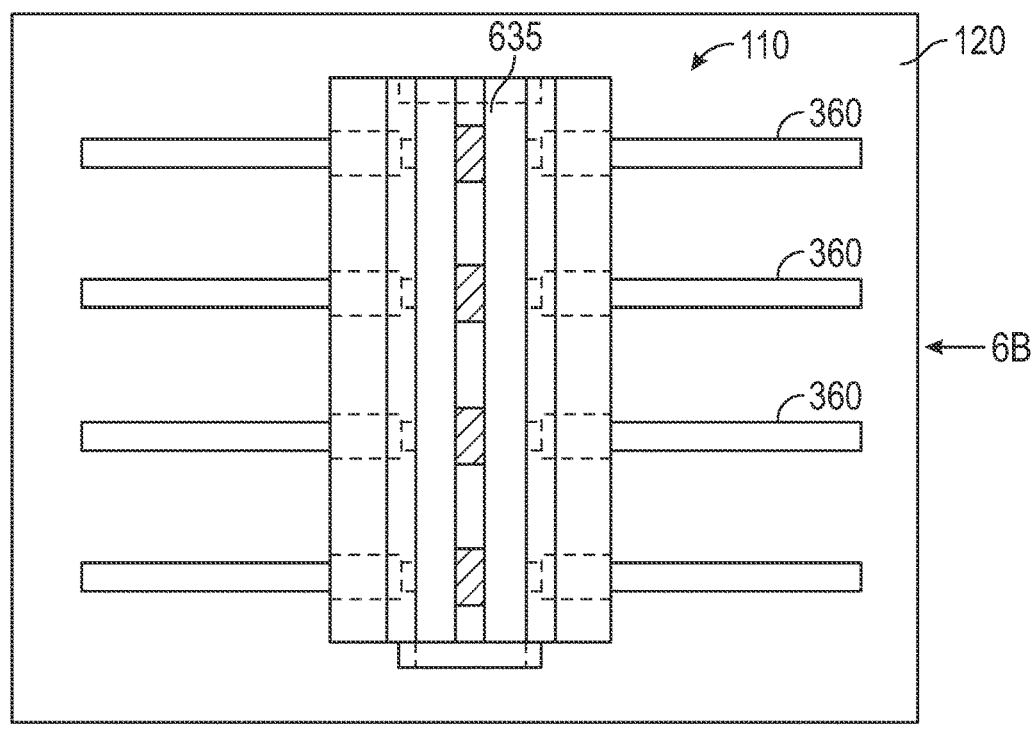
FIG. 6A is a top-down view of an infiltration module with central galley and outrigger wings of channels as may be employed in embodiments.
Figure 6B:
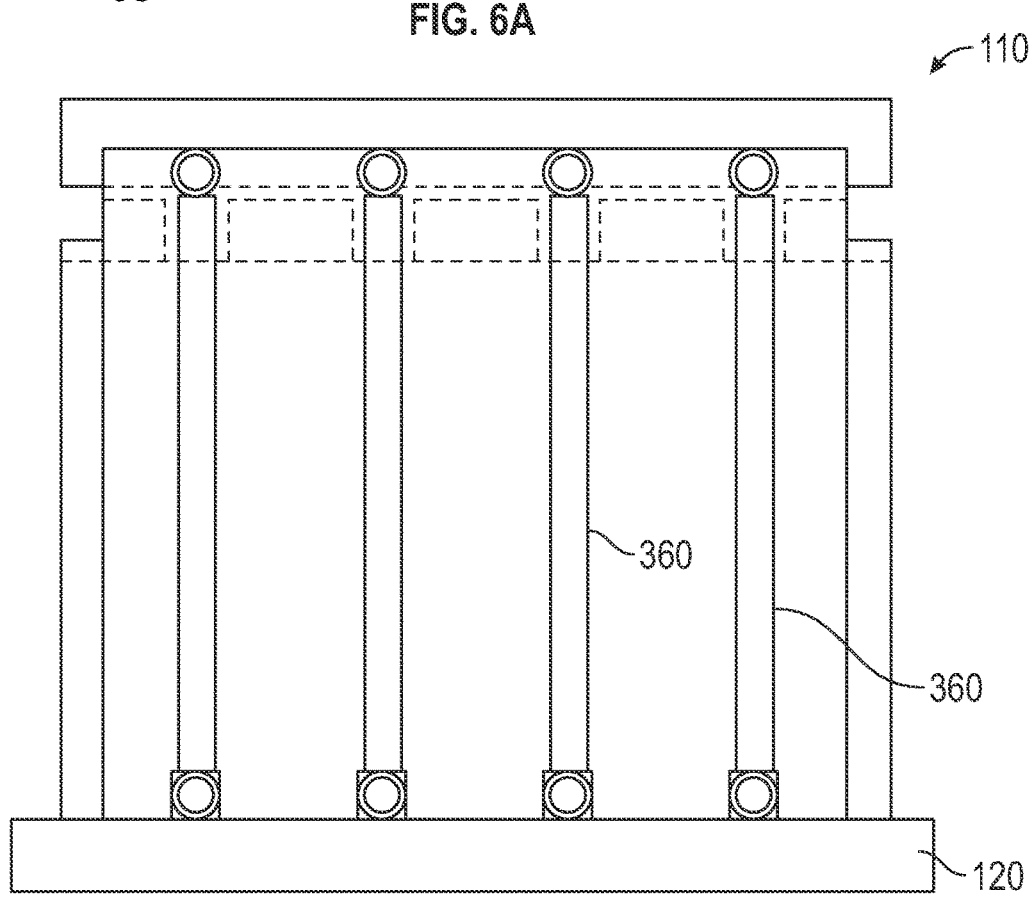
FIG. 6B is a side-elevation view of the infiltration module of FIG. 6A as may be employed in embodiments.
Figure 6C:
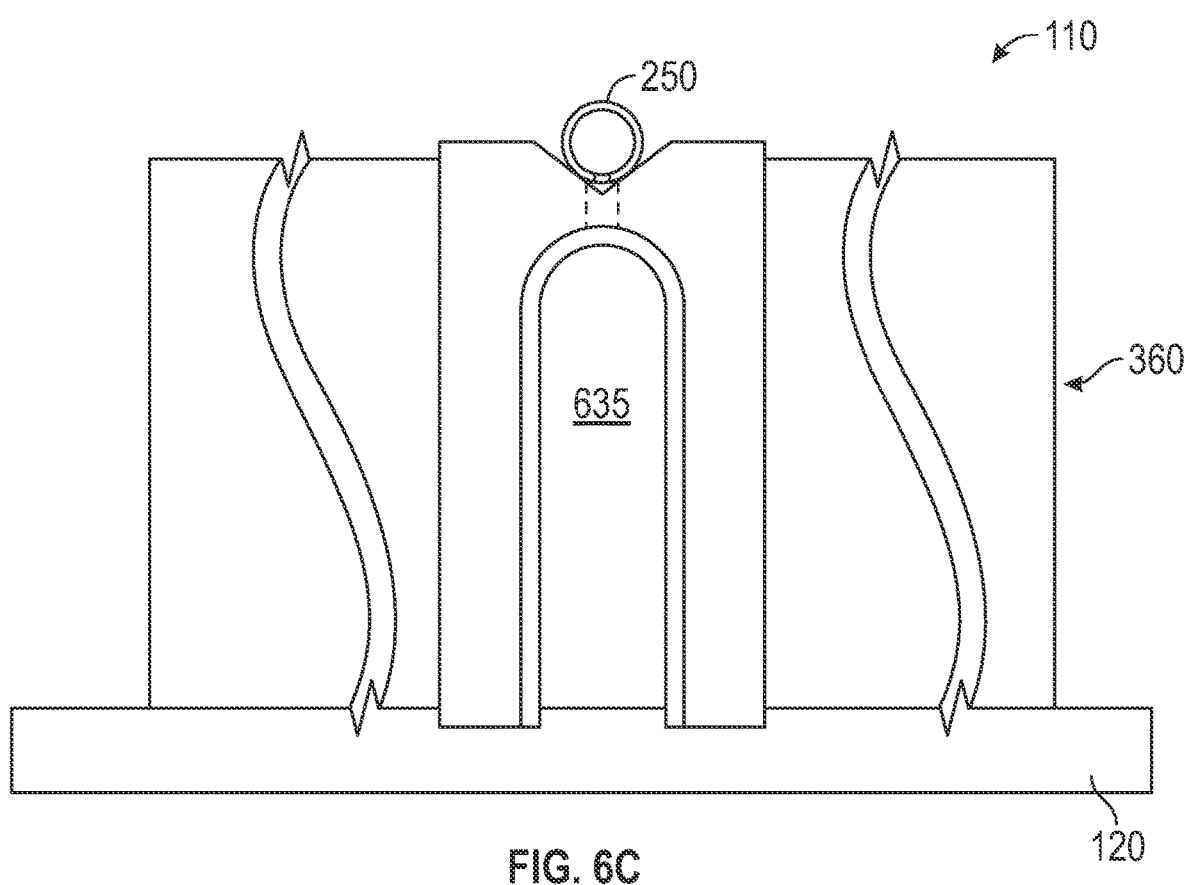
FIG. 6C is a side-elevation view of the infiltration module of FIG. 6A arrow 6C as may be employed in embodiments.

FIG. 6A is a top-down view of an infiltration module 110 with central galley 635 and outrigger wing style channels 360 as may be employed in embodiments. Arrow 601 shows the perspective view of FIG. 6C relative to FIG. 6A. FIG. 6B is a side-elevation view of the infiltration module 110 of FIG. 6A as may be employed in embodiments. As can be seen in FIG. 6B, the infiltration module 110 sits atop the distribution conduit 120, and, as also can be seen, bottoms of each of the channels 360 reach the top of the distribution conduit 120. FIG. 6C is a side-elevation view of the infiltration module of FIGS. 6A and 6B as may be employed in embodiments.

Labelled in FIG. 6C are the dosing conduit 250, the channels 360, the infiltration module 110, and the distribution conduit 120. As can be seen, the dosing conduit 250, which is shown as a circular pipe, sits atop the gallery 635 and feeds water to the gallery 635 and to the channels 360. Water may be redistributed by and between the channels 360 both by the gallery 635 and/or by the underlying distribution conduit 120.

Figure 7:
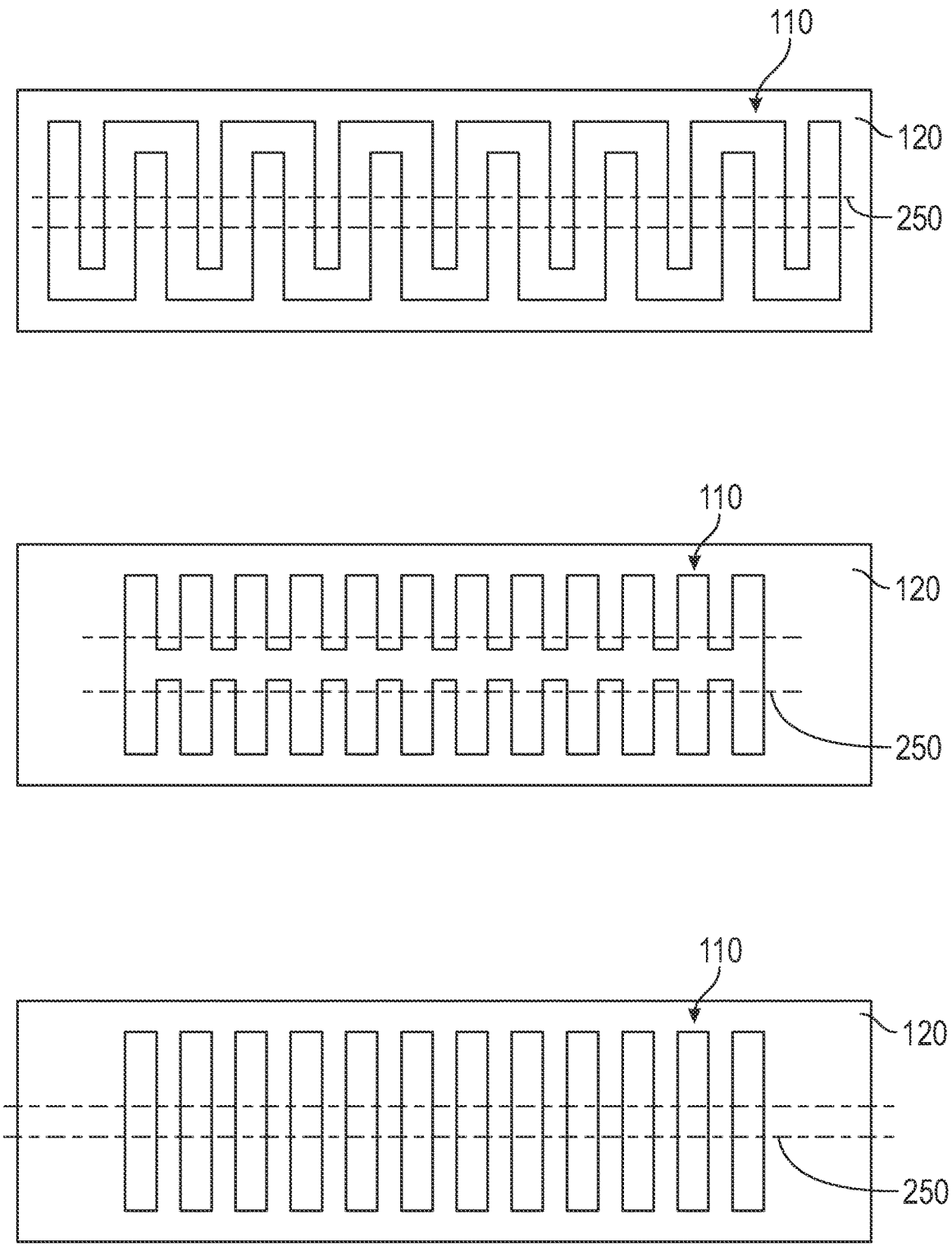
FIG. 7 shows top-down views of three infiltration modules, each with different configurations of channels, as may be employed in embodiments.

FIG. 7 shows top-down views of three infiltration modules 110, each with different configurations of channels, as may be employed in embodiments. The top infiltration module comprises a serpentine channel configuration with a centrally located dosing conduit 250. The middle infiltration module 110 comprises connected "H" style channels over the distribution conduit 120 and a centrally located dosing conduit 250. The left infiltration module 110 includes parallel and spaced channels (i.e., non-baffle), also with a centrally located dosing conduit 250.

Figure 8:
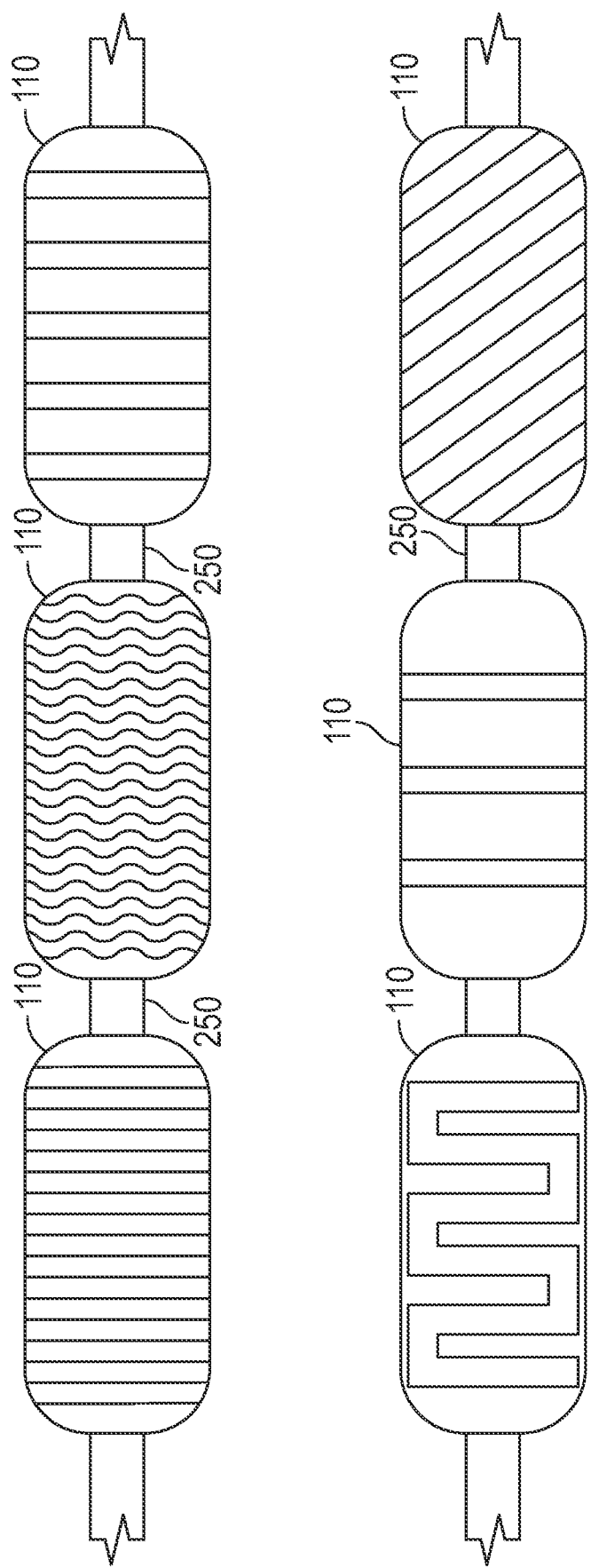
FIG. 8 is a top-down view of two sequential arrays of infiltration modules as may be installed in an infiltration field according to some embodiments.

FIG. 8 is a top-down view of two sequential linear arrangements of infiltration modules 110 as may be installed in an infiltration field according to some embodiments. As can be seen in FIG. 8 various styles of infiltration modules 110 may be employed in infiltration fields of embodiments. Dosing conduits 250 are labelled and show fluid connections between infiltration modules 110 and that different style infiltration modules may be fluidly connected to each other in an infiltration field.

Figure 9:
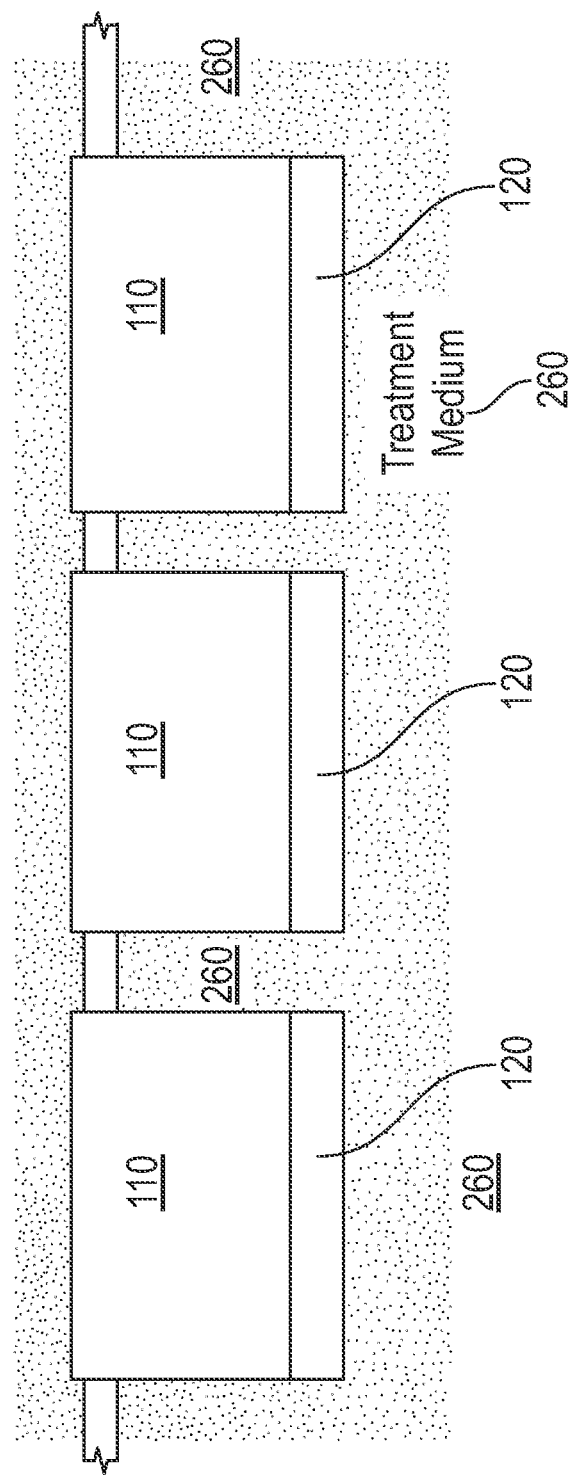
FIG. 9 is a side-elevation view of three infiltration modules installed in an infiltration field as may be employed in some embodiments.

FIG. 9 is a side-elevation view of three infiltration modules 110 installed in an infiltration field as may be employed in some embodiments. As can be seen in FIG. 9, treatment media 260 may be placed around the infiltration modules 110 of embodiments. Also evident in FIG. 9 is that distribution conduits 120 may be sized to coincide with the shape of the infiltration module 110 they are a part of. The three infiltration modules 110 are shown at the same invert elevation in FIG. 9 although in other embodiments the infiltration modules of an infiltration field may be positioned at different invert elevations. The dosing conduit may have a pitch of one-quarter inch per foot or more, or be level, in an infiltration field.

Some embodiments may comprise using the processes, systems, articles of manufacture, or apparatus with or in stormwater and wastewater systems that comprise: a processing/treatment vessel; a distribution system; and an infiltration system comprising an infiltration field, monitoring ports, and carbon addition ports. Some embodiments may comprise using the processes, systems, articles of manufacture, or apparatus with or in infiltration systems comprising infiltration fields comprised of stone, sand, hollow structures, man-made materials and/or synthetic media including geotextiles. Some embodiments may comprise using the processes, systems, articles of manufacture, or apparatus with or in infiltration systems installed directly in native or imported soils. Some embodiments may comprise using the processes, systems, articles of manufacture, or apparatus with or in stormwater or wastewater systems that include a secondary treatment vessel, such as but not limited to, a treatment unit. Some embodiments may comprise using the processes, systems, articles of manufacture, or apparatus with or in stormwater and wastewater infiltration field(s) with a surface area to void space ratio of approximately <0.5. Surface area to void space ratio may be calculated by various methods such as calculations based on of storage volumes or on calculations based on the dimensions of the infiltration field components, such as channels. Some embodiments may comprise using the processes, systems, articles of manufacture, or apparatus with or in stormwater and wastewater infiltration field(s) with a surface area to void space ratio of >0.5. Surface area to void space ratio may be calculated by various methods such as calculations based on of storage volumes or on calculations based on the dimensions of the infiltration system components, such as channels. Some embodiments may comprise using the processes, systems, articles of manufacture, or apparatus with or in infiltration systems that may be surrounded by the following soils:

Sands: silt+(1.5*clay)<15%
Loamy sands: silt+1.5*clay>=15% and silt+2*clay<30%
Sandy loams: clay>=7% and clay<20% and sand >52% and silt+2*clay>=30% OR clay<7% and silt<50% and silt+2*clay>=30%)
Loam: clay>=7% and clay<27% and silt>=28% and silt<50% and sand <=52%
Silt Loam: silt>=50% and clay>=12% and clay<27% OR silt>=50% and silt<80% and clay<12%
Silt: silt>=80% and clay<12%
Sandy Clay Loam: clay>=20% and clay<35% and silt<28% and sand >45%
Clay Loam: clay>=27% and clay<40% and sand >20% and sand <=45%
Silty Clay Loam: clay>=27% and clay<40% and sand <=20%
Sandy Clay: clay>=35% and sand >45%
Silty Clay: clay>=40% and silt>=40%
Clay: clay>=40% and sand <=45% and silt<40%

Some embodiments may comprise using the processes, systems, articles of manufacture, or apparatus with or in stormwater and wastewater systems that have stone, cobbles, gravel, ledge, bedrock, or soil parent material as the native material surrounding the system. Some embodiments may comprise using the processes, systems, articles of manufacture, or apparatus with or in stormwater and wastewater systems that have engineered media, such as specified sand or gravel/stone, as the material surrounding the system. Some embodiments may comprise using the processes, systems, articles of manufacture, or apparatus with or in stormwater or wastewater systems that include passive remediation infrastructure including, but not limited to, a constructed wetland, sand filters, gravel filters, waste stabilizing pond/lagoon, collection basin, rain garden, retention/detention areas, vegetated or dry swales, or underground detention systems. Some embodiments may comprise using the processes, systems, articles of manufacture, or apparatus with or in stormwater or wastewater systems that include vegetation pollutant removal, such as, but not limited to, rain gardens, bioswales, and evapotranspiration systems driven by such species as Salix or Phragmites. Some embodiments may comprise using the processes, systems, articles of manufacture, or apparatus with or in stormwater and wastewater systems that are covered with sand, imported or native soil. Some embodiments may comprise using the processes, systems, articles of manufacture, or apparatus with or in stormwater and wastewater systems that are covered with permeable or impermeable asphalt/pavement. Some embodiments may comprise using the processes, systems, articles of manufacture, or apparatus with or in stormwater and wastewater systems that open to the atmosphere. Some embodiments may comprise using the processes, systems, articles of manufacture, or apparatus with or in stormwater and wastewater systems that are located above grade.

Some embodiments may comprise using the processes, systems, articles of manufacture, or apparatus with or in wastewater systems that serve single residences, multi-family residences, commercial businesses, public organizations/property, private organizations/property, government buildings, and any other situation where onsite wastewater treatment or storm water management is used.

Some embodiments may comprise using the processes, systems, articles of manufacture, or apparatus with or in community based onsite wastewater treatment systems and any soil or water-based treatment systems serving as intermediate or final treatment or dispersal for wastewater treatment plants.

Some embodiments may comprise using the processes, systems, articles of manufacture, or apparatus with or in systems that employ a geotextile fabric within and/or around the system. The geotextile fabric may stabilize the sediment during treatment to avoid soil stratification by particle size.

Embodiments may be employed when a system is restricted or failing to treat and disperse wastewater. Embodiments may be employed when a system is overloaded with wastewater/stormwater and/or organic matter, causing low levels of oxygen within an infiltration field (which may occur either or both because microbial decomposition of organic matter consumes oxygen and because the oxygen concentrations in water are many thousands of times lower than oxygen concentrations in air). These situations may occur when a system is heavily used, the infiltration field is relatively undersized, or if there is an addition of materials to the system that are noncompatible with treatment in the infiltration system. Embodiments may be employed when a system is operating normally, or close to normally, and it is desirable to inhibit or prevent restriction or failing.

The preceding detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Certain embodiment designs may be implemented as a computer process, a computing system or as an article of manufacture such as a computer program product of computer readable media. The computer program product may be a computer storage medium readable by a computer system and encoding computer program instructions for executing a computer process.

While embodiments have been illustrated herein, they are not intended to restrict or limit the scope of the appended claims to such detail. In view of the teachings in this application, additional advantages and modifications will be readily apparent to and appreciated by those having ordinary skill in the art. Accordingly, changes may be made to the above embodiments without departing from the scope of the invention.

The terminology used herein is for the purpose of describing particular embodiments only and is not intended to be limiting of the invention. As used herein, the singular forms "a," "an" and "the" are intended to include plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "about" or "approximately" in reference to a recited numeric value, including for example, whole numbers, fractions, and/or percentages, generally indicates that the recited numeric value encompasses a range of numerical values (e.g., +/−5% to 10% of the recited value) that one of ordinary skill in the art would consider equivalent to the recited value (e.g., performing substantially the same function, acting in substantially the same way, and/or having substantially the same result). As used herein, the terms "about" or "approximately" in reference to a recited non-numeric parameter generally indicates that the recited non-numeric parameter encompasses a range of parameters that one of ordinary skill in the art would consider equivalent to the recited parameter (e.g., performing substantially the same function, acting in substantially the same way, and/or having substantially the same result).

Recitation of ranges of values herein are merely intended to serve as a shorthand method of referring individually to each separate value falling within the range, unless otherwise indicated herein, and each separate value is incorporated into the specification as if it were individually recited herein.

"First," "Second," etc. As used herein, these terms are used as labels for nouns that they precede, and do not imply any type of ordering (e.g., spatial, temporal, logical, etc.). For example, reference to a "first" item does not necessarily imply that this item is the item in a sequence; instead, the term "first" is used to differentiate this item from another item (e.g., a "second" item).

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

"Improve"—As used herein, improve is used to describe an increasing or maximizing effect. When a component or feature is described as improving an action, motion, or condition it may produce the desired result or outcome or future state completely. Additionally, "improve" can also refer to an increase of the outcome, performance, and/or effect which might otherwise occur. Accordingly, when a component, element, or feature is referred to as improving a result or state, it need not completely produce the desired result or state.

The scope of the present disclosure includes any feature or combination of features disclosed herein (either explicitly or implicitly), or any generalization thereof, regardless of whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The corresponding structures, material, acts, and equivalents of any means or steps plus function elements in the claims are intended to include any structure, material or act for performing the function in combination with other claimed elements. The description of certain embodiments of the present invention have been presented for purposes of illustration and description, but is not intended to be exhaustive or limited to the invention in the form disclosed. Many modifications and variations will be apparent to those of ordinary skill without departing from the scope and spirit of the invention. These embodiments were chosen and described in order to best explain the principles of the invention and the practical application, and to enable others of ordinary skill in the art to understand the invention for embodiments with various modifications as are suited to the particular use contemplated.

What is claimed is:

1. A water infiltration field system, comprising:
a plurality of upright channels, each channel having an upright passage with an open or permeable side, each channel having a height and a width;
and
a distribution conduit having a thickness of 0.0125 inches or more, the distribution conduit positioned along the open or permeable side of an infiltration channel of the plurality of upright channels, the distribution conduit flanking a portion of the open or permeable side of an infiltration channel of the plurality of upright channels, wherein, when installed, the bottom of each channel of the plurality of upright channels is more water permeable than surrounding treatment medium.

2. The water infiltration field system of claim 1 wherein upright passages of the channels of the plurality of upright channels are parallel to each other.

3. The water infiltration field system of claim 1 wherein the distribution conduit comprises an outer surface of geotextile fabric and wherein the distribution conduit is positioned along an outside surface of each of the channels of the plurality of upright channels.

4. The water infiltration field system of claim 1 wherein each channel of the plurality of upright channels comprises one upright cuspated wall.

5. The water infiltration field system of claim 1 wherein the height to width aspect ratio of each channel is three or more and no more than 96.

6. A water infiltration field system, comprising:
a plurality of upright channels, each channel having an upright passage with an open or permeable side, each channel having a height and a width;
and
a distribution conduit having a thickness of 0.0125 inches or more, the distribution conduit positioned along the open or permeable side of an infiltration channel of the plurality of upright channels, the distribution conduit flanking a portion of the open or permeable side of an infiltration channel of the plurality of upright channels, wherein a treatment medium is beneath the distribution conduit and wherein the distribution conduit is positioned completely underneath the plurality of upright channels.

7. A water infiltration field system, comprising:
a plurality of upright channels, each channel having an upright passage with an open or permeable side, each channel having a height and a width;
and
a distribution conduit having a thickness of 0.0125 inches or more, the distribution conduit positioned along the open or permeable side of an infiltration channel of the plurality of upright channels, the distribution conduit flanking a portion of the open or permeable side of an infiltration channel of the plurality of upright channels, wherein, when installed, the distribution conduit is more permeable than surrounding sand or soil.

8. A water infiltration field system comprising:
a first upright channel, the first upright channel having a first upright infiltrative surface;
a second upright channel adjacent to the first upright channel, the second upright channel having a second upright infiltrative surface;
a dosing conduit in fluid communication with the first and the second upright channels;
and
a distribution conduit positioned underneath the dosing conduit and flanking a bottom surface of the first upright channel and flanking a bottom surface of the second upright channel.

9. The water infiltration field system of claim 8 wherein the distribution conduit has a thickness of ¾ inch or more and wherein the first upright channel and the second upright channel each have a height to width aspect ratio of three or more and no more than 96.

10. The water infiltration field system of claim 8 wherein the distribution conduit comprises a repeating plastic grid.

11. The water infiltration field system of claim 8 wherein the distribution conduit comprises a stringy structure comprising entangled polymer filaments.

12. The water infiltration field system of claim 8 wherein the first upright channel is parallel to the second upright channel and wherein the distribution conduit covers a portion of the first infiltrative surface and a portion of the second infiltrative surface.

13. The water infiltration field system of claim 8 wherein the first upright channel is wrapped with geotextile fabric and the distribution conduit is wrapped with geotextile fabric and the height to width aspect ratio of the first upright channel is different than the height to width aspect ratio of the second upright channel.

14. The water infiltration field system of claim 8 wherein the distribution conduit is at least partially underlain by a treatment medium.

15. The water infiltration field system of claim 14 wherein the treatment medium comprises sand or soil.

16. The water infiltration field system of claim 8 wherein the first upright channel and the second upright channel have a treatment medium at least partially below them.

17. A transportable water infiltration field system comprising:
a plurality of upright channels, each channel having a plurality of upright walls wherein one or more of the upright walls is covered in filter fabric, each channel having a height and a width and a bottom and a side;
a distribution conduit, the distribution conduit positioned in fluid communication with each channel of the plurality of upright channels,
the distribution conduit flanking the bottom and/or the side of each channel of the plurality of upright channels or
the distribution conduit flanking a bottom portion of an upright interface or filter fabric of each channel of the plurality of channels,
wherein, when installed, the water infiltration field system further comprises a treatment medium positioned outside of at least one upright channel of the plurality of upright channels and below the distribution conduit.

18. The transportable water infiltration field system of claim 17 wherein filter fabric is positioned along at least some upright walls of the plurality of upright walls.

19. The transportable water infiltration field system of claim 17 wherein the height to width aspect ratio of each upright channel of the plurality of upright channels is three or more and no more than 96.

20. A transportable water infiltration field system comprising:

a plurality of upright channels, each channel having a plurality of upright walls wherein one or more of the upright walls is covered in filter fabric, each channel having a height and a width and a bottom and a side;

a distribution conduit, the distribution conduit positioned in fluid communication with each channel of the plurality of upright channels, the distribution conduit flanking the bottom and/or the side of each channel of the plurality of upright channels or the distribution conduit flanking a bottom portion of an upright interface or filter fabric of each channel of the plurality of channels, wherein a first upright channel of the plurality of upright channels has a first height to width aspect ratio and a second upright channel of the plurality of upright channels has a second height to width aspect ratio, the second height to width aspect ratio being larger than the first height to width aspect ratio.

21. A transportable water infiltration field system comprising:

an infiltration baffle matrix, the infiltration baffle matrix having a height, a width, and a length, the infiltration baffle matrix comprising a plurality of upright infiltrative walls, where at least some of the upright walls are distinct and separated from each other; and a distribution conduit having a thickness of 0.0125 inches or more positioned adjacent to a bottom of a majority of the plurality of upright infiltrative walls of the infiltration baffle matrix, wherein one or more of the upright walls comprises a polymer and a filter fabric, wherein the majority of upright walls of the infiltration baffle matrix are parallel to each other, and the infiltration baffle matrix is partially wrapped in filter fabric.

22. The transportable water infiltration field system of claim 21 wherein filter fabric is positioned about the infiltration baffle matrix and the distribution conduit.

23. The transportable water infiltration field system of claim 21, further comprising:

a dosing conduit in fluid communication with the infiltration baffle matrix, the dosing conduit, positioned to discharge wastewater atop or into at least some of the upright walls of the infiltration baffle.

24. The transportable water infiltration field system of claim 21 wherein the plurality of upright walls comprises at least six upright parallel walls.

25. A transportable water infiltration field system comprising:

an infiltration baffle matrix, the infiltration baffle matrix having a height, a width, and a length, the infiltration baffle matrix comprising a plurality of upright infiltrative walls, where at least some of the upright walls are distinct and separated from each other; and a distribution conduit having a thickness of 0.0125 inches or more positioned adjacent to a bottom of a majority of the plurality of upright infiltrative walls of the infiltration baffle matrix, wherein a first upright wall of the plurality is solid and comprises a first polymer and a second upright wall of the plurality comprises the first polymer and comprises perforations.

* * * * *